(No Model.)
C. A. CHEEVER.
ELECTRO MAGNETIC DISPATCH TUBE.
No. 259,817. Patented June 20, 1882.
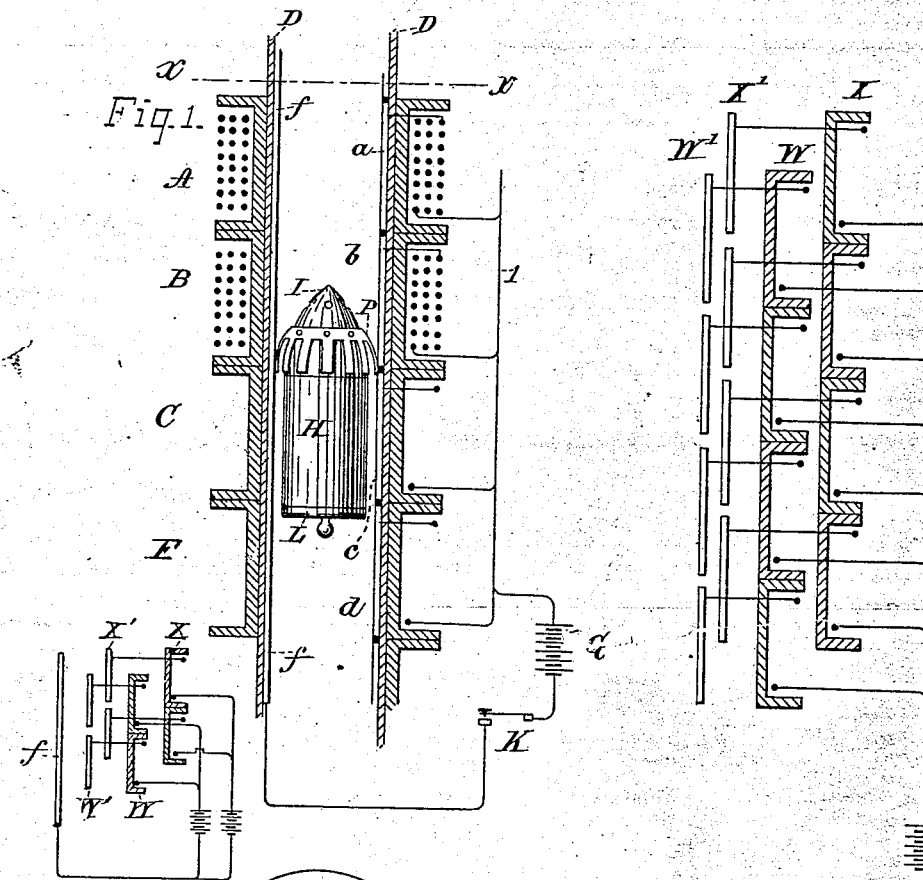
WITNESSES:
Thomas Toomey
Geo. C. Coffin
INVENTOR
Chas. A. Cheever
BY H. C. Townsend,
ATTORNEY

UNITED STATES PATENT OFFICE.

CHARLES A. CHEEVER, OF NEW YORK, N. Y.

ELECTRO-MAGNETIC DISPATCH-TUBE.

SPECIFICATION forming part of Letters Patent No. 259,817, dated June 20, 1882.

Application filed February 25, 1882. (No model.)

*To all whom it may concern:*

Be it known that I, CHARLES A. CHEEVER, of the city, county, and State of New York, have invented an Electro-Magnetic Dispatch-Tube, of which the following is a specification.

The general object of my invention is to provide a simple and effective means for transmitting letters, parcels, and other light objects from one place to another through the agency of electricity.

My invention consists of certain novel combinations of a series of hollow coils or helices, a galvanic battery, one pole of which is permanently connected by a series of branch wires to one end of the coils or helices, the other ends of said coils or helices being left open-circuited, and a traveling carrier provided with circuit-closing devices for completing the circuit between the open ends of the helices, and a conductor connected directly to the other pole of the stationary battery, which combination will be hereinafter described, and then specified in the claims.

My invention also consists of certain novel devices used in the combination, the nature of which will be readily understood from the following description and drawings, and which will be specified in the claims.

In carrying out my invention I propose to close the circuit through the coils or helices by means of conducting springs or brushes attached to and moving with the carrier, and I have shown in the drawings one special construction for accomplishing this, in which the springs or brushes are made to form a path for the current from one to the other of conducting-plates arranged on the inside of the carrier-tube and connected with the battery or source of electrical supply and with the terminals of the coils. I contemplate, however, closing the circuit in other ways, and it is by no means necessary that the circuit should be through the carrier or its attachments, although this is generally desirable, and is particularly so if the carrier be spherical and made to roll in the tube, in which case the surface of the carrier itself, if conducting material, may serve to close the circuit. If desired, the path of the current may be outside of the carrier entirely, and in this case the carrier could be made to act mechanically or otherwise upon the circuit-closing apparatus, which would then be located in the side of the tube, as before, but would form the sole path for the current.

One of the special methods and constructions that may be employed in carrying out my invention is shown in the accompanying drawings, in which Figure 1 is a vertical section of a portion of a carrier-tube or guide and its enveloping sets of electro-magnetic coils or helices, showing the carrier as just passing from one coil or helix into the influence of the next. Fig. 2 is a cross-section of the tube on the line X X of Fig. 1. Fig. 3 is a vertical section of one special construction of carrier. Fig. 4 illustrates a modified arrangement of the coils designed for the purpose of keeping the carrier under a constant and uninterrupted attractive influence.

Referring to Fig. 1, A and B represent two bobbins of conducting-wire wound upon spools in the ordinary way and slipped upon a tube, D, of any suitable material. Similar spools are indicated at C and F, the coils, however, being omitted, and their manner of connection to the battery and circuit-closing plates merely indicated. One end of each of the conducting coils or helices is connected to a wire, 1, leading from one pole of a secondary pile, a galvanic battery, or any other suitable generator of electricity, G, while the opposite ends of the bobbins or coils are connected to corresponding plates of conducting material, *a b c d*, insulated from one another and arranged on the interior of the tube D, and by preference let into the body of the same, so as leave a smooth interior.

It is obvious that instead of plates contact studs or points may be employed, brushes having an extended contact-surface being used to make contact with them. If the tube D be of conducting material, the plates should also be insulated from the tube. If it be, however, of insulating material, this provision will obviously be unnecessary.

At *f* is shown a continuous metal strip let into the inside of the tube at any convenient point, either opposite to or beside the strips *a b c d*, and connected with a wire running to a circuit-closing key or button, by means of which the circuit between said strip and one pole of the battery G may be closed at pleasure.

If the tube D be of conducting material, the strip $f$ may be dispensed with, the surface of the tube itself then serving the purpose of said strip. The tube D and the spools upon which the coils are wound should be as thin as is consistent with the necessary strength, in order that the coils may be as near as possible to the carrier, and so act to the best advantage.

If the tube be of conducting material, the strips $a\ b\ c\ d$ may be attached directly to the inside of the spools, the tube being slit to allow the strips to project through so as to be flush with its interior surface, and to be in the path of the brush or circuit-closing spring upon the carrier. This modification is shown in Fig. 5, D indicating the metal tube in vertical section on the line of the slot, $m$ a spool, and $n$ the metal plate upon the inside of the spool. The tube is slotted longitudinally to allow the plate to project through. The tube itself is connected to the battery and key. The slot should be wide enough to prevent the plate from touching the edges of the opening. The carrier is so constructed as to be drawn within the coils or helices when the electric current is allowed to circulate through them. This end may be attained in any of the well-known ways, either by making the carrier of coils or helices, through which the current is made to simultaneously circulate, or by making it of some magnetizable material. The latter method is preferable as giving advantages in the way of simplicity and lightness. If it be made of steel, it may be permanently magnetized, increased attractive effects being then obtained.

The form of the carrier is not material. It may be either cylindrical or spherical, the shape depending upon the circumstances under which it is to be used. If employed in a vertical tube, I prefer to make it in the shape of an elongated hollow cylinder having a conical head. If it is to be used in a horizontal tube, it may be made spherical or in any other shape by which it may be made to roll in the tube.

The carrier should be made as light as possible. To this end I propose to make the portion of the same which is of magnetic material of thin sheet-iron or steel and the other portions of papier-maché or similar light substance.

H represents the hollow body of the carrier, made of thin sheet-iron, and I the conical head, of papier-maché, screwed to the tube or body H, or connected to the same in any other suitable manner.

L represents a stopper at the lower end of the tube. The hollow body of the carrier as thus constructed forms the receptacle for the objects to be conveyed. By making the carrier of thin sheet-iron I secure lightness without material reduction of attractive effects, the field of greatest attraction exerted by the coils being at the sides of the guide-tube. The head I and the stopper L are perforated, as shown, in order to allow the air to escape readily from in front of the carrier as it travels.

P represents a circuit-closing brush or spring, attached to the head of the carrier at a point above the tube H, and surrounding the same entirely, so as to preserve contact with the plates $a$, $b$, &c., however the carrier may turn upon its vertical axis.

The brushes or springs may be made of any good conducting material. I sometimes make them of steel or other magnetizable material, so that even when made of a number of pieces hung loosely they will be drawn into contact with the sides of the tube by the attraction of the helices, so as to make good electrical connection.

The relation and the proportion of the various parts are shown in Fig. 1.

The brush or circuit-closer P should by preference be so constructed that in passing from one plate to another it will not break circuit—that is, it should, before breaking contact with one plate, make contact with the next ensuing plate. This, however, is not essential. The magnetic portion of the carrier is by preference slightly shorter than the space occupied by a single bobbin or helix, A B, &c. The brush P is so located with relation to the tube H as to make contact with a plate, as $b$, just before the upper end of the tube H enters the lower end of the corresponding bobbin, B. It may, however, be arranged to make contact after the tube has partially entered the bobbin, but before the tube H has reached the point of magnetic equilibrium with relation to the bobbin.

The operation is as follows: The carrier being inserted at the lower end of the tube, the brush P will make contact with a conducting-plate corresponding to the bobbin or helix within which the carrier is wholly or partially included, thus closing the electric circuit for the helix through the plate, the brush, the strip $f$, or the body of the tube D, as the case may be, and the key or push-button K which is for the time being depressed. The coil thereupon draws the carrier up within itself to a point where it closes the circuit through the next ensuing coil, which latter immediately exerts its influence and draws the carrier upward in turn, and so on through the entire length of the tube, or until such time as the circuit may be broken at K.

In order to insure a constant attractive and lifting action of the coils upon the carrier, I propose to sometimes employ two sets of coils or helices, one set overlapping the other. These coils may be arranged one set entirely outside the other; or they may be arranged with the wires of one set wound with the wires of the other set upon the same spool, and side by side throughout.

Referring to Fig. 4, W represents the spools of one set of coils or helices, arranged in the same manner as those shown in Fig. 1, and X the spools of another set arranged to overlap or break joint with those of the first. Corresponding sets of conducting-plates arranged in the same manner as in Fig. 1 are indicated at W' and X', the plates of one set of course overlapping those of the other. The common return strip, plate, or tube corresponding to $f$, Fig. 1, is not here shown. The two sets of coils or helices may obviously be supplied from the same battery, as indicated, or from separate batteries.

Fig. 6 indicates the latter arrangement. In this arrangement, if the brush be constructed to break contact for an instant in passing from one plate to the next, the current from a battery is never divided between two coils. As will be seen by the above arrangement, the carrier is constantly under the influence of two sets of coils, and when the force with which it is lifted within a coil of one set is weak, that with which it tends to rise within a coil of the other will be strong. Uniformity of action is thus secured, and there is no danger of cessation of the lifting force as the brush passes from one plate to the next ensuing plate. This arrangement may be carried to a further extent than here shown, and three or even more separate sets of coils or helices may be used, the coils of each set breaking joint or overlapping the coils of the others.

Many modifications will readily suggest themselves to those skilled in the art. The key K may obviously be dispensed with, and other arrangements and constructions of the circuit-closing devices may be employed. The carrier may be of other forms and constructions, and so also may the tube or guide which directs it. The surrounding coils or helices may also be mounted and constructed in other ways.

What I claim as my invention is—

1. The combination, substantially as described, of a tube or guideway, a series of surrounding coils or helices, an electric generator, one pole of which is connected by a series of branch wires, as shown, constantly connected to one end of each of the independent coils or helices, the other ends of said coils or helices being left open-circuited, a traveling carrier moving within the coils, and means, as described, for completing the circuit between the open end of each coil or helix as the carrier moves, and a common return wire or conductor permanently connected to the other pole of the battery.

2. The combination, substantially as described, of a tube or guideway, a series of surrounding coils or helices, one end of each of which is permanently connected to a common wire leading from one pole of a galvanic battery or generator, contact plates, points, or strips upon the inside of the tube connected to the other ends of the coils, a traveling carrier provided with contact springs or brushes, and a conductor leading from the opposite pole of the battery and extending throughout the tube or guideway, between which conductor and the open end of each of the coils or helices in succession the circuit is completed as the carrier progresses.

3. The combination, substantially as described, of a series of coils or helices, contact plates or points in the magnetic field of said coils, a traveling carrier, and contact springs or brushes of a magnetizable material connected to said carrier.

4. The combination, substantially as described, of a tube or guideway, a series of surrounding coils or helices, insulated contact plates, points, or strips connected to said coils in succession, and arranged upon the inside of the tube or carrier, a continuous strip, plate, or surface, also arranged upon the inside of the tube, and a circuit-closing spring or brush mounted upon the traveling carrier, for completing the circuit between the successive insulated plates and the continuous plate or surface.

5. The combination, substantially as described, of a tube or guideway, a series of surrounding helices, and a carrier moving within the same, consisting of a hollow cylinder of sheet-iron, steel, or equivalent material, provided with means whereby it may be opened and closed to allow of the insertion and retention of the articles to be transported.

6. The combination of the hollow sheet-iron cylinder, the conical head of non-magnetic material, and the circuit-closing springs or brushes attached to the head.

7. A cylindrical carrier for an electro-magnetic dispatch-tube, provided with circuit-closing springs or brushes completely encircling said carrier.

8. The combination of the hollow cylinder H, of steel or iron, the conical head I, of papier-maché, and the annular circuit-closing spring or brush P.

9. The combination, with an electro-magnetic dispatch-tube or carrier, of two or more sets of enveloping helices arranged, as described, so that the coils of one set will overlap or break joint with the coils of the others.

In testimony whereof I have hereunto set my hand this 23d day of February, 1882.

CHAS. A. CHEEVER.

Witnesses:
W. L. CANDEE,
L. H. SHANKS.